(12) United States Patent
Joo

(10) Patent No.: US 10,096,861 B2
(45) Date of Patent: Oct. 9, 2018

(54) METHOD OF MANUFACTURING LITHIUM SECONDARY BATTERY

(71) Applicant: Lithium Plus Inc, Seoul (KR)

(72) Inventor: seung-ki Joo, Seongnam (KR)

(73) Assignee: LITHIUM PLUS INC, Seoul (KR)

(*) Notice: Subject to any disclaimer, the term of this patent is extended or adjusted under 35 U.S.C. 154(b) by 463 days.

(21) Appl. No.: 14/951,746

(22) Filed: Nov. 25, 2015

(65) Prior Publication Data

US 2016/0308251 A1    Oct. 20, 2016

(30) Foreign Application Priority Data

Apr. 15, 2015  (KR) .................. 10-2015-0053077

(51) Int. Cl.

| | | |
|---|---|---|
| *H01M 10/0585* | (2010.01) | |
| *H01M 4/04* | (2006.01) | |
| *H01M 4/136* | (2010.01) | |
| *H01M 4/1397* | (2010.01) | |
| *H01M 4/66* | (2006.01) | |
| *H01M 4/80* | (2006.01) | |
| *H01M 10/0525* | (2010.01) | |
| *H01M 4/58* | (2010.01) | |
| *H01M 4/62* | (2006.01) | |
| *H01M 4/02* | (2006.01) | |

(52) U.S. Cl.
CPC ..... *H01M 10/0585* (2013.01); *H01M 4/0416* (2013.01); *H01M 4/0471* (2013.01); *H01M 4/136* (2013.01); *H01M 4/1397* (2013.01); *H01M 4/662* (2013.01); *H01M 4/808* (2013.01); *H01M 10/0525* (2013.01); *H01M 4/5825* (2013.01); *H01M 4/623* (2013.01); *H01M 4/625* (2013.01); *H01M 2004/021* (2013.01); *H01M 2004/028* (2013.01); *H01M 2220/30* (2013.01)

(58) Field of Classification Search
None
See application file for complete search history.

(56) References Cited

FOREIGN PATENT DOCUMENTS

| KR | 10-2013-0025525 A | * | 3/2013 |
|---|---|---|---|
| KR | 20130043750 | | 5/2013 |
| KR | 10-2013-0101375 A | * | 9/2013 |
| WO | WO-98/21767 A | * | 5/1998 |

* cited by examiner

*Primary Examiner* — Jeffry H Aftergut
(74) *Attorney, Agent, or Firm* — Cantor Colburn LLP

(57) ABSTRACT

Provided is a method of manufacturing a lithium secondary battery, in which, after filling a slurry containing a positive electrode active material in a plurality of pores of a metal foam, followed by performing a heat treatment process under an optimal condition, the positive electrode active material is firmly adhered in the plurality of pores of the metal foam, to thus prevent a positive electrode active material from being peeled off from the pores at the time of driving the lithium secondary battery, and increase reliability of the lithium secondary battery.

8 Claims, 7 Drawing Sheets

METHOD OF MANUFACTURING LITHIUM SECONDARY BATTERY

FIELD OF THE INVENTION

The present invention relates to a method of manufacturing a lithium secondary battery, and more particularly, to a method of manufacturing a lithium secondary battery having an excellent oxidation/reduction reaction rate of lithium and a battery capacity characteristic, by filling a slurry in a metal form a three-dimensional pore structure where the slurry is obtained by mixing a positive electrode active material, a binder, a conductive material, and an organic solvent, and adhering the positive electrode active material to pores via a heat treatment process, to thereby increase a surface area in which the positive electrode active material adhered in the pores of the metal foam contacts an electrolytic solution, to thus reduce an internal resistance of the lithium secondary battery.

BACKGROUND OF THE INVENTION

In recent years, the technological development and demand for electronic devices including portable devices are rapidly increasing and thus demand for secondary batteries as an energy source are rapidly increasing.

In addition, toy model helicopters, drones (such as military unmanned airplanes which can fly and control due to the induction of radio waves), electric vehicles, etc., also need batteries such as rechargeable batteries which are light, small in size, and with high capacity.

Among these secondary batteries, lithium secondary batteries having a high energy density, an operating potential characteristic, a long cycle life, and a low self-discharge rate are commercially available and widely used.

So far, the positive electrode of the lithium secondary battery is made into a very small thickness via a heat treatment and pressing process, after coating a small amount of a positive electrode active material of a slurry state on a thin aluminum (Al) foil of a two-dimensional structure.

If the active material is coated thicker, movement of electrons and lithium ions may be limited and the active material may fall off from the foil. That is, since only a very thin active material can be coated to avoid the limited movement of electrons and lithium ions and the fall-off of the active material, active material, a considerable wide area and weight is required in order to have a high capacity.

Korean Patent Application Publication No. 10-2013-0043750, disclosed a method of producing a metal foam for a secondary battery electrode in which an active material is coated on a metal form with a gel (sol-gel) method, the method including the steps of: (a) preparing a solution containing a precursor compound; (b) penetrating the solution into the surface and the interior of a metal foam; (c) drying the metal foam; and (d) heat treating the metal foam.

In this Korean Patent Application Publication No. 10-2013-0043750, a lithium secondary battery is manufactured by directly coating the active material on the surface and internal pore walls of the metal foam by using a sol-gel method, and thus the active material is thinly coated on the surface and internal pore walls of the metal foam due to flow of the active material in a sol solution, to thereby cause a limit to increase the capacity.

Furthermore, the active material is coated only on the surface of the metal foam in the case of a physical vapor deposition (PVD) method, a chemical vapor deposition (CVD) method, and a thermal spraying method, to thereby cause a limit to increase the capacity.

Further, a precursor solution can be also coated in the pores of the metal foam through an ion plating process, a sol-gel process, a coprecipitation method, an impregnation method, or the like, or a method of forming a coating layer may be also used through drying and firing processes by penetrating a colloidal solution into the pores of the metal foam in which active material particles to be coated are dispersed in the colloidal solution. However, even in this case, the active material is thinly coated on the internal pore walls of the metal foam, to thereby cause unstable cell characteristics.

SUMMARY OF THE INVENTION

The present invention has been made in view of the points described above, and it is an object of the present invention to provide a method of manufacturing a lithium secondary battery having a high capacity characteristic by increasing a surface area in which the positive electrode active material adhered in the pores of the metal foam contacts an electrolytic solution, and reducing an internal resistance of the lithium secondary battery, to thereby enhance an oxidation/reduction reaction rate of lithium and have a battery capacity characteristic.

It is another object of the present invention to provide a method of manufacturing a lithium secondary battery, to prevent a positive electrode active material from being peeled off from pores at the time of driving the lithium secondary battery and increase a filling rate of a slurry containing the positive electrode active material in a metal foam, to thereby to improve a charge-discharge capacity and provide an excellent reliability.

In order to achieve the above object according to the present invention, there is provided a method of manufacturing a lithium secondary battery, the method comprising the steps of: preparing a metal form having a plurality of first pores; filling a slurry made by mixing the positive electrode active material, a binder, a conductive material and an organic solvent into the first pores of the metal foam; removing the organic solvent in the slurry by heat-treating the slurry-filled metal foam, to thereby adhere the positive electrode active material, the binder and the conductive material on inner walls of the first pores, and thus obtain a metal foam positive electrode in which second pores smaller than the first pores are formed in the first pores; coating an electrolytic solution on a surface of the metal foam positive electrode to thereby penetrate the electrolytic solution into the second pores; and sequentially laminating a separator and a negative electrode on both surfaces of the metal foam positive electrode into which the electrolytic solution has been penetrated.

In some embodiments, the viscosity of the slurry is preferably of 1,000~100,000 cP.

In some embodiments, the heat treatment is preferably conducted for 2 to 12 hours at a temperature of 50~300° C.

In some embodiments, the metal foam can be made of an alloy such as Al, NiCrAl, NiFeCrAl, NiCr, NiAl, or CrAl, and the first pores are formed of a three-dimensional open pore structure.

In some embodiments, the method further comprises a step of reducing thickness of the metal foam positive electrode by pressing the metal foam positive electrode, between the step of obtaining the metal foam positive electrode and the step of coating the electrolytic solution on the surface of the metal foam positive electrode to thereby penetrate the electrolytic solution into the second pores.

In some embodiments, the thickness of the metal foam positive electrode is preferably 1.5 to 2 times as large as those of the first pores in size.

In some embodiments, the binder preferably contains 1~50 wt % in the total weight of a positive electrode material made of the positive electrode active material, the binder, and the conductive material.

In some embodiments, the conductive material is a carbon-based powder, and preferably contains 5 to 30 wt % in the total weight of the slurry.

Effects of the Invention

In a method of manufacturing a lithium secondary battery according to the present invention, after filling a slurry containing a positive electrode active material in a plurality of pores of a metal foam, followed by performing a heat treatment process under an optimal condition, the positive electrode active material is firmly adhered in the plurality of pores of the metal foam, to thus prevent a positive electrode active material from being peeled off from the pores at the time of driving the lithium secondary battery, and increase reliability of the lithium secondary battery.

In a method of manufacturing a lithium secondary battery according to the present invention, an organic solvent is removed from a slurry containing a positive electrode active material via a heat treatment process in which the slurry is filled in the pores of the metal foam to thus form pores in size smaller than pores of a metal foam, and an electrolytic solution is penetrated into the pores formed by the heat treatment process thereby increasing a surface area in which the positive electrode active material adhered in the pores of the metal foam contacts the electrolytic solution, and thus reducing an internal resistance of the lithium secondary battery, to thereby enhance an oxidation/reduction reaction rate of lithium and have a high capacity characteristic.

In a method of manufacturing a lithium secondary battery according to the present invention, a viscosity of a slurry containing a positive electrode active material is optimized, to thereby facilitate the mixing of the positive electrode active material, a binder, a conductive material and an organic solvent, and a filling rate of the slurry filled into a metal foam is heightened, to thereby improve a charge-discharge capacity.

DETAILED DESCRIPTION FOR CARRYING OUT THE INVENTION

Hereinafter, a method of manufacturing a lithium secondary battery according to an embodiment of the present invention will be described in detail with reference to the accompanying drawings.

In the case of a method of manufacturing a lithium secondary battery according to an embodiment of present invention, a slurry made by mixing a positive electrode active material, a binder, a conductive material and an organic solvent is filled into a plurality of first pores of a metal foam, and then the slurry-filled metal foam is heat-treated, to thereby adhere the positive electrode active material on inner walls of the first pores, and simultaneously form second pores smaller than the first pores in the first pores to thus realize a metal foam positive electrode. Accordingly, by facilitating penetration of an electrolytic solution into the second pores and increasing a surface area in which the positive electrode active material adhered in the pores of the metal foam contacts the electrolytic solution, an internal resistance of the lithium secondary battery is reduced, and thus an oxidation/reduction reaction rate of lithium is enhanced.

Figure 1:
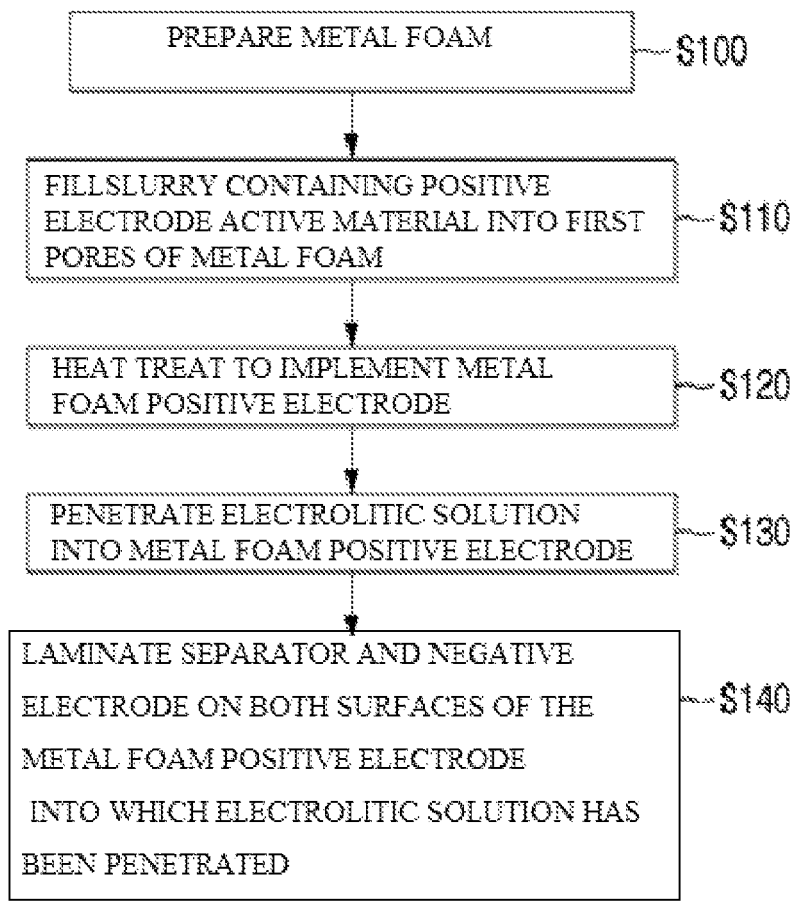
FIG. 1 is a flow chart of a method for manufacturing a lithium secondary battery according to the present invention.

FIG. 1 is a flow chart of a method for manufacturing a lithium secondary battery according to the present invention.

A method of manufacturing a lithium secondary battery according to an embodiment of the present invention, first, includes a step of preparing a metal foam having a plurality of first pores of a three-dimensional structure (S100).

Here, the metal foam can be made of an alloy such as Al, NiCrAl, NiFeCrAl, NiCr, NiAl, or CrAl, and is formed of the plurality of first pores of a three-dimensional open pore structure.

The metal foam may be prepared and manufactured in a variety of ways. For example, by sputtering and coating nickel on a polyurethane foam, and then coating Ni, Cr and Al powders thereon to then heat-treat the result, to thereby prepare a NiCrAl alloy metal form. That is, by performing sputtering and heat treatment processes, the NiCrAl alloy metal form is prepared in which a NiCrAl alloy is coated in the polyurethane foam and in the inner walls of the pores of the inner portion of the polyurethane foam.

Then, thickness of the metal foam can be determined via a mechanical polishing or press. That is, a light and thin lithium secondary battery can be produced in the course of slimming thickness of the metal foam.

In addition, a first pore size in the metal foam can be set to be 1500 μm or below so that a diffusion distance becomes shorter.

Then, a slurry made by mixing a positive electrode active material, a binder, a conductive material and an organic solvent is filled into the plurality of first pores of the metal foam (S110).

In this step S110, the positive electrode active material is mixed with the binder, the conductive material, and the organic solvent, to create a slurry, and the slurry is configured to have a viscosity in the optimal range, to thereby improve a filling rate of the metal foam filled into the first pores.

Here, the viscosity of the slurry may be determined substantially in accordance with the content of the organic solvent, and as the organic solvent content becomes high, the value of the viscosity becomes low. In this embodiment of the present invention, the slurry preferably has a viscosity range of 1,000~100,000 cP.

Here, when the viscosity of the slurry is less than 1,000 cP, the filling rate of the slurry filled into the pores of the metal foam is reduced since the flow of the slurry becomes too large, and thus the amount of the positive electrode active material adhered to the metal foam becomes small, to thus make a charge-discharge capacity become small.

Then, when the viscosity of the slurry is more than 100,000 cP, the amount of the organic solvent becomes small, and thus the process of mixing the positive electrode active material, the binder and the conductive material is difficult, to thereby fail to prepare a slurry of a desired characteristic. In addition, the flowability of the slurry is too low to fill the slurry into the inside of the metal foam.

The slurry can be prepared by mixing the organic solvent with the positive electrode active material, the binder and the conductive material which are in a powder form. That is, the positive electrode active material powder such as $LiFePO_4$, $LiCoO_2$, or $LiMn_2O_4$, the binder powder containing polyvinylidene fluoride (PVdF) and a carbon-based powder used as the conductive material are mixed with the organic solvent such as N-methyl-2-pyrrolidone (NMP).

In some embodiments of the present invention, in order to maximize the filling rate of the slurry into the metal foam, the thickness of the metal foam is preferably 1.5 to 2 times that of the first pore size. For example, when the first pore size is 450 μm, the thickness of the metal form is set to 675~900 μm, and when the first pore size is 1200 μm, the thickness of the metal foam is set to 1800~2400 μm.

According to a method of filling the slurry into the metal foam, the slurry is pushed into one surface of the metal foam, and is filled so that the slurry comes out to the other side thereof, and then a process of pushing the slurry into the other surface of the metal foam in the same process as the process of pushing the slurry into the one surface of the metal foam is performed multiple times so that the slurry is well filled into the inside of the metal foam.

Then, the binder preferably contains 1~50 wt % in the total weight of a positive electrode material made of the positive electrode active material, the binder, and the conductive material except the organic solvent in the slurry.

Then, the slurry-filled metal foam is heat-treated to remove the organic solvent in the slurry and the positive electrode active material, the binder and the conductive material are adhered on the inner walls of the first pores and simultaneously a metal foam positive electrode is obtained by the removal of the organic solvent in which second pores smaller than the first pores are formed in the first pores (S120).

Here, the heat treatment is preferably conducted for 2 to 12 hours at a temperature of 50~300° C. depending on the organic solvent. In some embodiments of the present invention, it is preferable to perform the heat treatment for 6 to 12 hours at a temperature of 150~200° C.

When the slurry-filled metal foam is heat-treated, the organic solvent mixed in the slurry is removed. Accordingly, second pores smaller than the first pores are formed and only the positive electrode active material, the binder and the conductive material remain, and are adhered on the inner walls of the first pores of the metal foam.

Subsequently, an electrolytic solution is applied on the surface of the metal foam positive electrode, thereby penetrating the electrolytic solution into the second pores (S130).

Here, prior to laminating the metal foam positive electrode on a separator and a negative electrode in a subsequent step, a few drops of the electrolytic solution are dropped on one surface of the metal foam positive electrode by using a spoide (or a dropper) to then permeate to the other surface of the metal foam positive electrode and allow the electrolytic solution to be well penetrated into the metal foam positive electrode.

Meanwhile, in some embodiments of the present invention, the method of manufacturing a lithium secondary battery may further perform a step of reducing thickness of the metal foam positive electrode by pressing the metal foam positive electrode, between the step S120 of obtaining the metal foam positive electrode and the step S130 of coating the electrolytic solution on the surface of the metal foam positive electrode to thereby penetrate the electrolytic solution into the second pores. Here, the step of reducing thickness of the metal foam positive electrode by pressing the metal foam positive electrode may be performed before or after performing the heat treatment process.

Finally, the separator and the negative electrode are sequentially stacked on both surfaces of the metal foam positive electrode into which the electrolytic solution has been penetrated (S140). In this way, the metal foam positive electrode and the negative electrode are separated by using the separator interposed between the metal foam positive electrode and the negative electrode.

In this case, the negative electrode may be formed of a plate of a lithium metal or graphite material, and is disposed as close as possible to both surfaces of the metal foam positive electrode to thereby prepare a lithium secondary battery.

Figure 2:
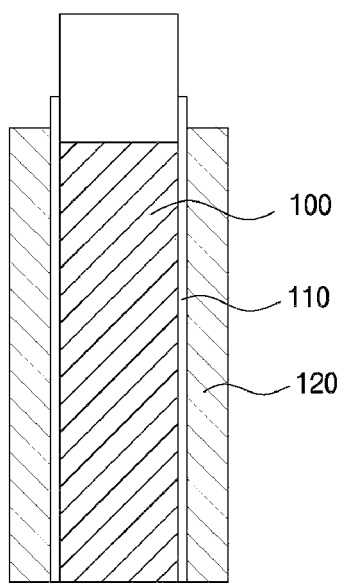
FIG. 2 is a schematic sectional view of a lithium secondary battery according to the present invention.

Therefore, as shown in FIG. 2, a lithium secondary battery can be prepared by performing the above process, in which the lithium secondary battery is configured so that a separator 110 and a negative electrode 120 are sequentially laminated on both surfaces of the metal foam positive electrode 100.

Therefore, in a method of manufacturing a lithium secondary battery according to the present invention, after filling a slurry containing a positive electrode active material in a plurality of pores of a metal foam, followed by performing a heat treatment process under an optimal condition, the positive electrode active material is firmly adhered in the plurality of pores of the metal foam, to thus prevent a positive electrode active material from being peeled off from the pores at the time of driving the lithium secondary battery, and increase reliability of the lithium secondary battery.

In addition, in a method of manufacturing a lithium secondary battery according to the present invention, an organic solvent is removed from a slurry containing a positive electrode active material via a heat treatment process in which the slurry is filled in the pores of the metal foam to thus form pores in size smaller than pores of a metal foam, and an electrolytic solution is penetrated into the pores formed by the heat treatment process thereby increasing a surface area in which the positive electrode active material adhered in the pores of the metal foam contacts the electrolytic solution, and thus reducing an internal resistance of the lithium secondary battery, to thereby enhance an oxidation/reduction reaction rate of lithium and have a high capacity characteristic.

Hereinbelow, results of experimental examples of the present invention will be described in detail on the basis of examples and comparative examples of the present invention.

Example 1

A slurry was prepared by mixing 1 g of $LiFePO_4$ (75 wt %) as a positive electrode active material, 0.2 g of carbon black (15 wt %) as a conductive material, and 0.13 g of polyvinylidene fluoride (PVdF) (10 wt %) as a binder with 1 ml of N-methyl-2-pyrrolidone (NMP) as an organic solvent. The resulting slurry was filled into pores of a NiCrAl alloy metal foam whose pore size was 450 μm and whose thickness was 600 μm, and then heat-treated at a temperature of 150° C., to thereby prepare a metal foam positive electrode for a lithium secondary battery.

Example 2

Except that the thickness of the metal foam was produced into 300 μm, the metal foam positive electrode was prepared in the same manner as in Example 1.

Example 3

Except that the thickness of the metal foam was produced into 1000 μm, the metal foam positive electrode was prepared in the same manner as in Example 1.

Example 4

The same slurry as in Example 1 was filled into pores of an Al metal foam whose pore size was 600 μm and whose thickness was 1000 μm, and then heat-treated at a temperature of 150° C., to thereby prepare a metal foam positive electrode. Thereafter, the prepared two metal foam positive electrodes were overlapped.

Example 5

Figure 3A:
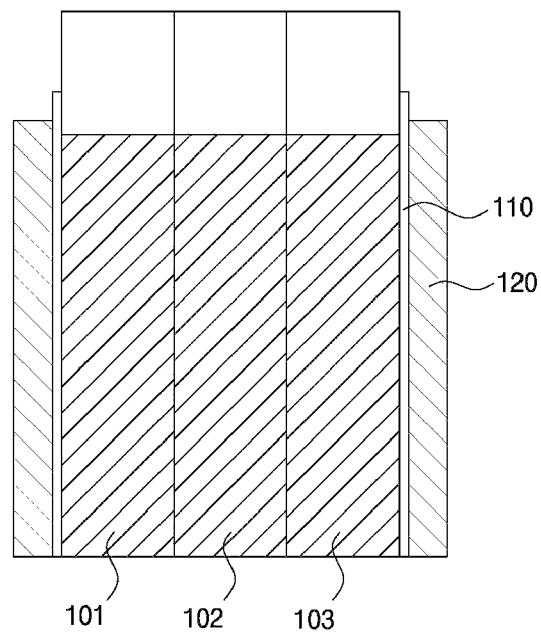
FIGS. 3A and 3B are schematic sectional views of a lithium secondary battery configured by superposing a metal foam positive electrode in accordance with an embodiment of the present invention.

Metal foam positive electrodes were produced in the same manner as in Example 4, except that three metal foam positive electrodes were overlapped. That is, as shown in FIG. 3A, the metal foam positive electrodes 101, 102 and 103 were overlap. In this way, a separator 110 and a negative electrode 120 were sequentially laminated on both surfaces of the three overlapped metal foam positive electrodes 101, 102 and 103, to thereby prepare a lithium secondary battery which will be applied to Experimental Example 2 to be described later.

Example 6

The same slurry as in Example 1 was filled into pores of a NiCrAl alloy metal foam whose pore size was 450 μm and whose thickness was 700 μm, and then heat-treated at a temperature of 150° C., to thereby prepare a metal foam positive electrode for a lithium secondary battery without a press process.

Example 7

Except that a press process was performed to reduce the thickness of the metal foam from 700 μm to 350 μm after heat-treating at 150° C., the metal foam positive electrodes were manufactured in the same manner as in Example 6.

Example 8

When a slurry was prepared by mixing the positive electrode active material, the binder, and the conductive material with the organic solvent, the content of the carbon black as the conductive material in the slurry was 4 wt %. The resulting slurry was filled into pores of a NiCrAl alloy metal foam whose pore size was 450 μm and whose thickness was 700 μm, and then heat-treated at a temperature of 150° C., to thereby prepare a metal foam positive electrode for a lithium secondary battery.

Example 9

Except that the content of the carbon black as the conductive material was 11 wt %, the metal foam positive electrode was prepared in the same manner as in Example 8.

Example 10

Except that the content of the carbon black as the conductive material was 15 wt %, the metal foam positive electrode was prepared in the same manner as in Example 8.

Example 11

Except that the content of the carbon black as the conductive material was 20 wt %, the metal foam positive electrode was prepared in the same manner as in Example 8.

Example 12

When a slurry was prepared by mixing the positive electrode active material, the binder, and the conductive material with the organic solvent, the content of the carbon black as the conductive material in the slurry was 5 wt %. The resulting slurry was pressed before being filled into pores of a NiCrAl alloy metal foam whose pore size was 450 μm, and then was filled into pores of the metal foam and then heat-treated at a temperature of 150° C., to thereby prepare a metal foam positive electrode.

Example 13

Except that the slurry was filled into the NiCrAl alloy metal foam, and then heat-treated and pressed, the metal foam positive electrode was prepared in the same manner as in Example 12.

Example 14

When a slurry was prepared by mixing the positive electrode active material, the binder, and the conductive material with the organic solvent, the content of the carbon black as the conductive material in the slurry was 5 wt %. The resulting slurry was filled into pores of a NiCrAl alloy metal foam whose pore size was 450 μm, and then heat-treated for 3 hours at a temperature of 150° C., to thereby prepare a metal foam positive electrode.

Example 15

Except that the heat treatment time was performed for 6 hours, the metal foam positive electrode was prepared in the same manner as in Example 14.

Example 16

Except that the heat treatment was performed for 12 hours, the metal foam positive electrode was prepared in the same manner as in Example 14.

Example 17

Except that the heat treatment was performed for 3 hours at a temperature of 250° C., the metal foam positive electrode was prepared in the same manner as in Example 14.

Example 18

Except that the heat treatment was performed for 6 hours at a temperature of 250° C., the metal foam positive electrode was prepared in the same manner as in Example 14.

Comparative Example

The same slurry as in Example 1 was coated on an aluminum foil and then dried and pressed, and heat-treated for 8 hours at 150° C. to obtain a positive electrode for a lithium secondary battery.

Experimental Example 1

A separator to separate positive and negative electrodes and a lithium metal were laminated on both sides of respective positive electrodes manufactured in Example 1 and Comparative Example, and 1M of the electrolytic solution of $LiPF_6$ in EC:DEC (1:1) was injected to prepare a lithium secondary battery. Then, the charge-discharge characteristics of the prepared lithium secondary battery were investigated at a current of 4 mA between 2.5~4V.

Figure 4:
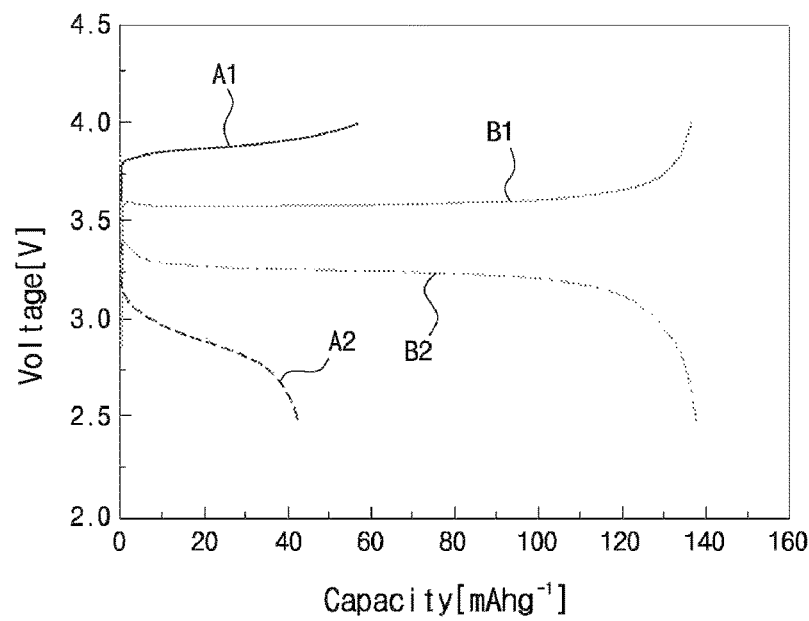
FIGS. 4 to 11 are graphs for measurements according to experimental examples of the present invention.

The results were shown in FIG. 4. The internal resistance value of the lithium secondary battery using the NiCrAl alloy metal foam as the positive electrode was significantly decreased as compared to the lithium secondary battery using the foil, the capacity of the former was higher by about 20 mAh/g as compared to the latter, and the output characteristic of the former was emerged much higher than the latter. It could be confirmed from this point of view that the electrolytic solution was penetrated into the inside of the electrode to thus allow an oxidation/reduction reaction to be performed in the entire the metal foam of the inside of the electrode, and a surface area in which the positive electrode active material adhered in the pores of the metal foam contacts the electrolytic solution was very large, to thus reduce an internal resistance of the lithium secondary battery. Here, A1 and A2 in FIG. 4 are charge-discharge curves of Example 1, and B1 and B2 are charge-discharge curves of Comparative Example.

Experimental Example 2

After making batteries of Examples 1-3 in the same manner as in Experimental Example 1, discharge capacities were compared at an identical current of 2, 4, 6, 8, and 10 mA.

Figure 5:
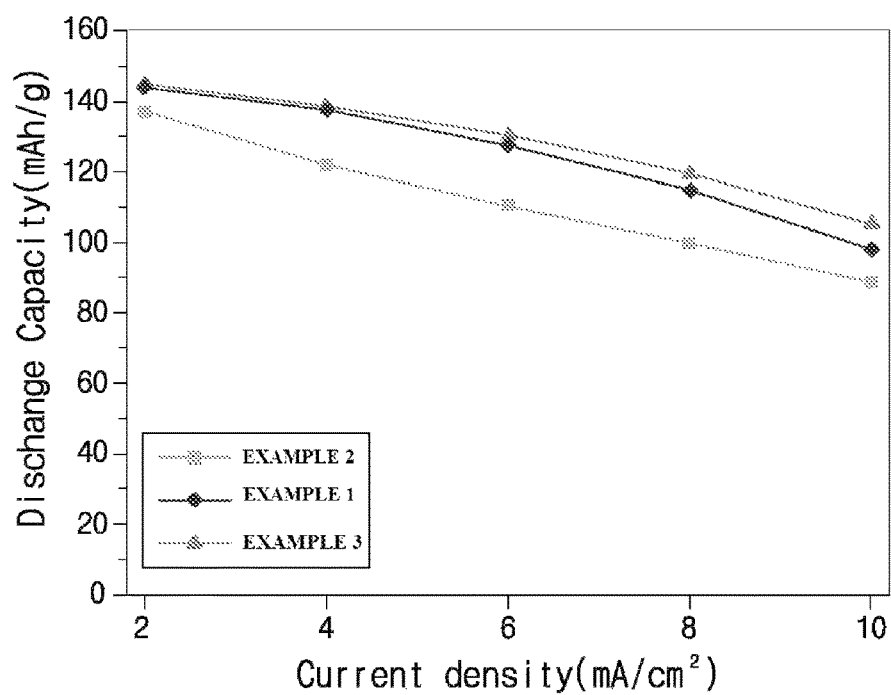

The results were shown in FIG. 5. In Examples 1 and 3, thickness of the metal foam was large approximately 1.5-fold to two-fold in comparison to the pore size, and a stable and similar capacity was maintained although a current became high. Meanwhile, in Example 2, thickness of the metal foam was smaller than the pore size, and a surface area in which the positive electrode active material adhered in the pores of the metal foam contacts the electrolytic solution was relatively smaller than those of Examples 1 and 3, to thus maintain a low capacity.

Experimental Example 3

After making batteries of Examples 4 and 5 in the same manner as in Experimental Example 1, discharge capacities were measured and compared by 10 cycles respectively at a current of 5 and 7 mA.

Figure 6:
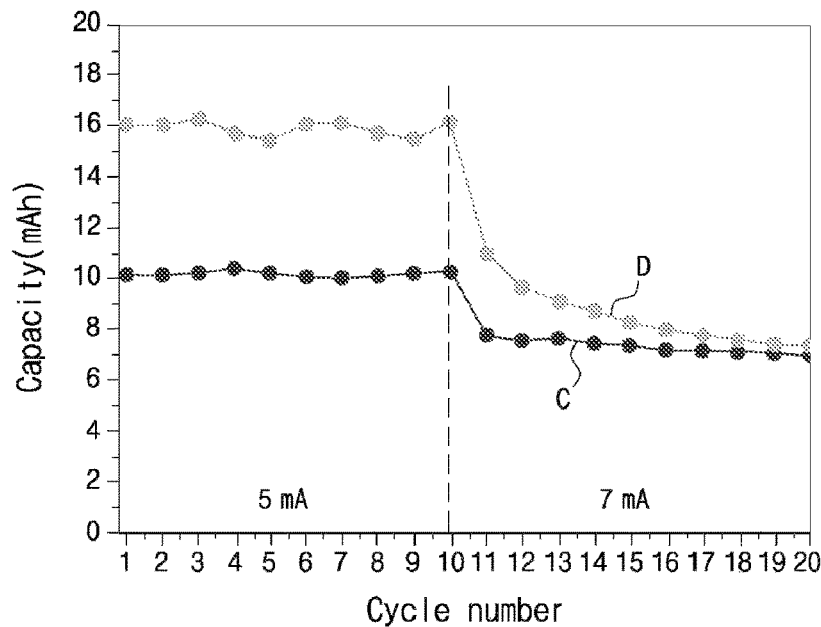

The results were shown in FIG. 6. Example 5 (curve D of FIG. 6) in which 3 metal foam positive electrodes were overlapped exhibited a high capacity of about 1.5 times that of Example 4 (curve C of FIG. 6) in which 2 metal foam positive electrodes were overlapped, in a low current of 5 mA. However, when the current was increased to 7 mA, Example 5 exhibited a similar capacity to Example 4.

This was because an insertion/desorption reaction of lithium was performed in the entire metal foam positive electrode of Example 5, in the lower current, but the insertion/desorption reaction of lithium was not performed well up to the inside of the electrode when the current became high. It could be confirmed that a negative electrode including lithium should be disposed between the metal foam positive electrodes in order to have a high capacity even at a high current.

Figure 3B:
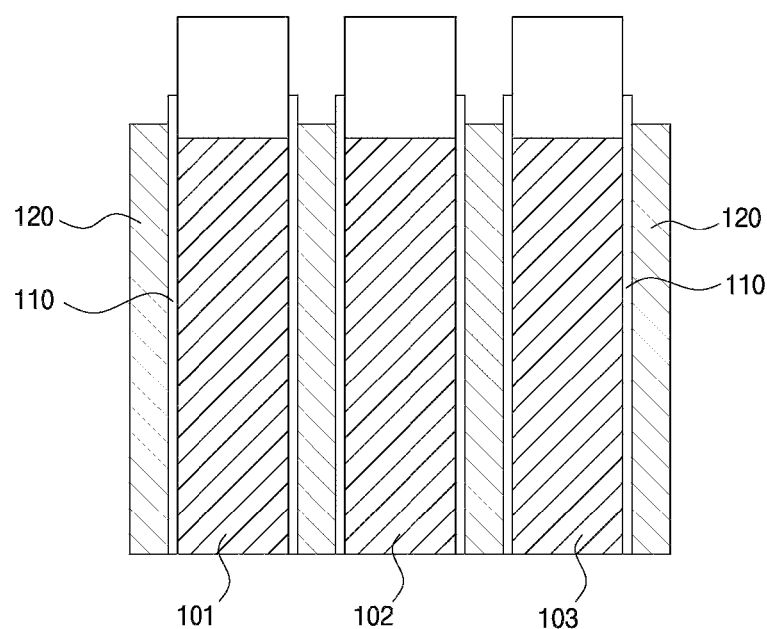

As a result, as shown in FIG. 3B, it could be confirmed that a separator 110 and a negative electrode 120 were interposed between three overlapped metal foam positive electrodes 101, 102, and 103 so as to have a high capacity.

Experimental Example 4

After making batteries of Examples 6 and 7 in the same manner as in Experimental Example 1, charge-discharge capacities were compared at a current of 10 mA.

Figure 7:
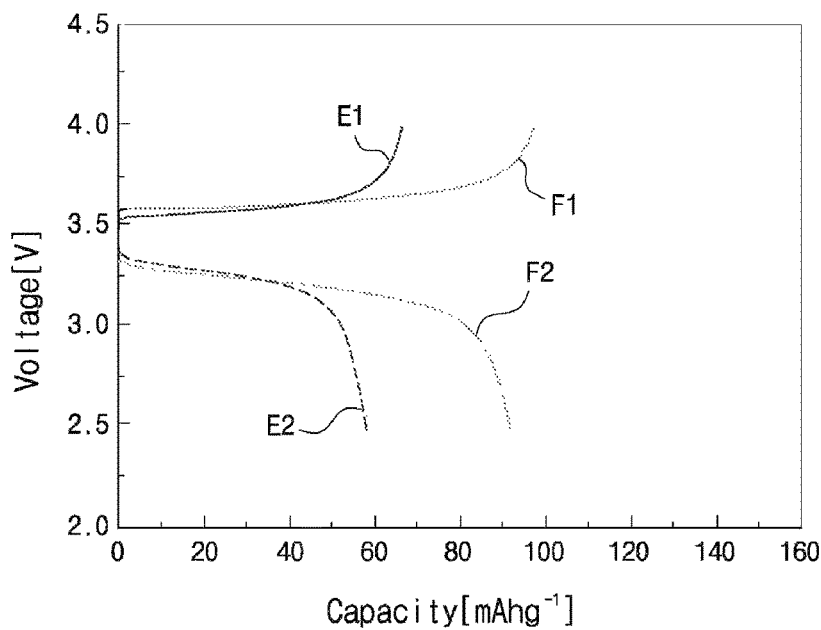

The results were shown in FIG. 7. Example 6 that did not undergo a press (curves E1 and E2 of FIG. 7) had a higher capacity than Example 7 that underwent a press (curves F1 and F2 of FIG. 7). It could be confirmed that this was because the electrolytic solution was facilitated to penetrate into the inside of the metal foam positive electrode when a press was not undergone, to thus cause a wide surface area of the oxidation/reduction reaction of lithium.

Experimental Example 5

Figure 8:
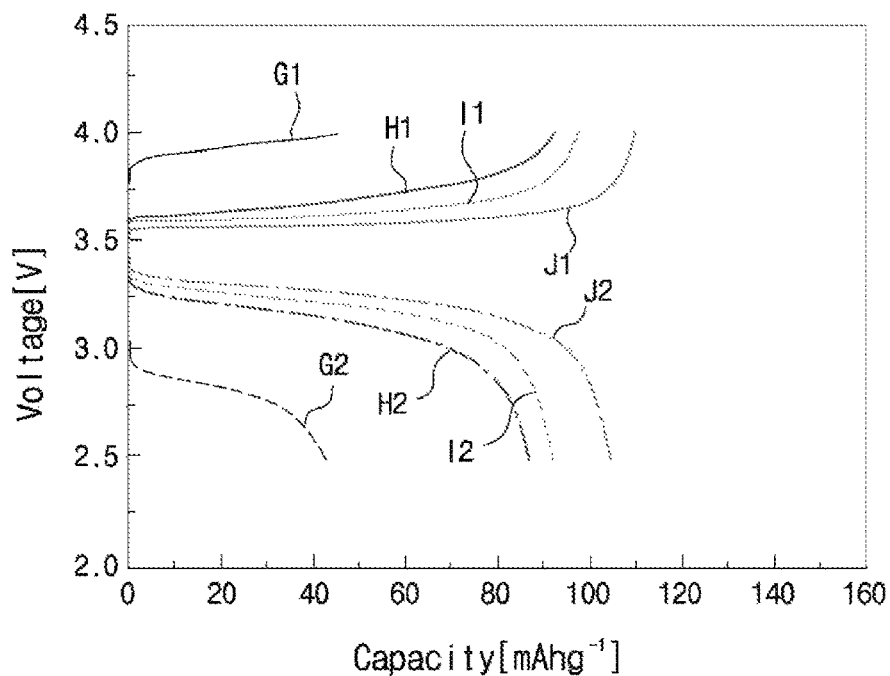

After making batteries of Examples 8 to 11 in the same manner as in Experimental Example 1, charge-discharge capacities were compared at a current of 10 mA. Here, Example 8 (curves G1 and G2 of FIG. 8) was configured so that the content of the carbon black in the slurry was 4 wt %, Example 9 (curves H1 and H2 of FIG. 8) was configured so that the content of the carbon black in the slurry was 11 wt %, Example 10 (curves I1 and I2 of FIG. 8) was configured so that the content of the carbon black in the slurry was 15 wt %, and Example 11 (curves J1 and J2 of FIG. 8) was configured so that the content of the carbon black in the slurry was 20 wt %.

As a result, Examples 9 to 11 containing the content of the carbon black of 5 wt % or more showed a high capacity of 80 $mAhg^{-1}$, and Example 8 containing the content of the carbon black of less than 5 wt % indicated a low charge-discharge capacity due to a very high internal resistance. This was because the internal resistance of the electrode became high when the content of the carbon black was less, to thus cause a slow oxidation/reduction reaction of lithium.

That is, in some embodiments of the present invention, the conductive material of 5~30 wt % could be contained in the total weight of the slurry, in which the conductive material was a carbon-based powder. The conductive material of 5~20 wt % could be preferably contained in the total weight of the slurry.

Experimental Example 6

After making batteries of Example 12 and 13 in the same manner as in Experimental Example 1, charge-discharge capacities were compared at a current of 6 mA.

Figure 9:
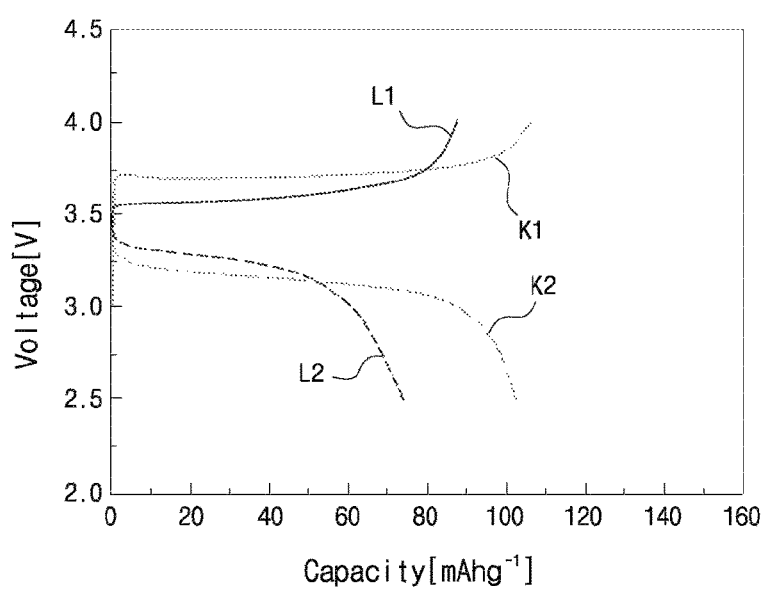

The results were shown in FIG. 9. Example 12 that underwent a press before filling the slurry (curves K1 and K2 of FIG. 9) exhibited a higher capacity than Example 13 that underwent a press after filling the slurry and performing heat-treatment (curves L1 and L2 of FIG. 9), because the electrolytic solution was facilitated to penetrate into the inside of the metal foam positive electrode when a press was undergone before filling the slurry.

Experimental Example 7

After making batteries by using the metal foam positive electrodes of Examples 14 to 18, discharge capacities were measured and compared for 10 cycles at a current of 1.5 mA.

Figure 10:
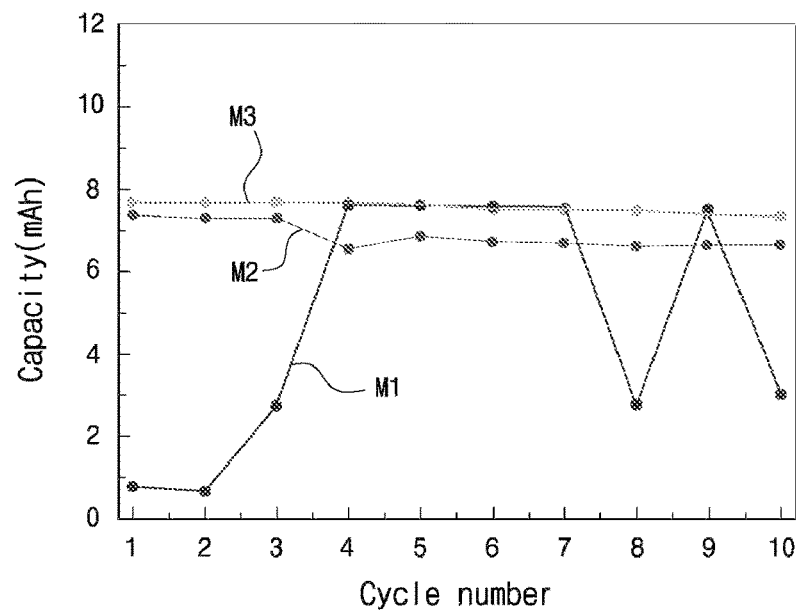
Figure 11:
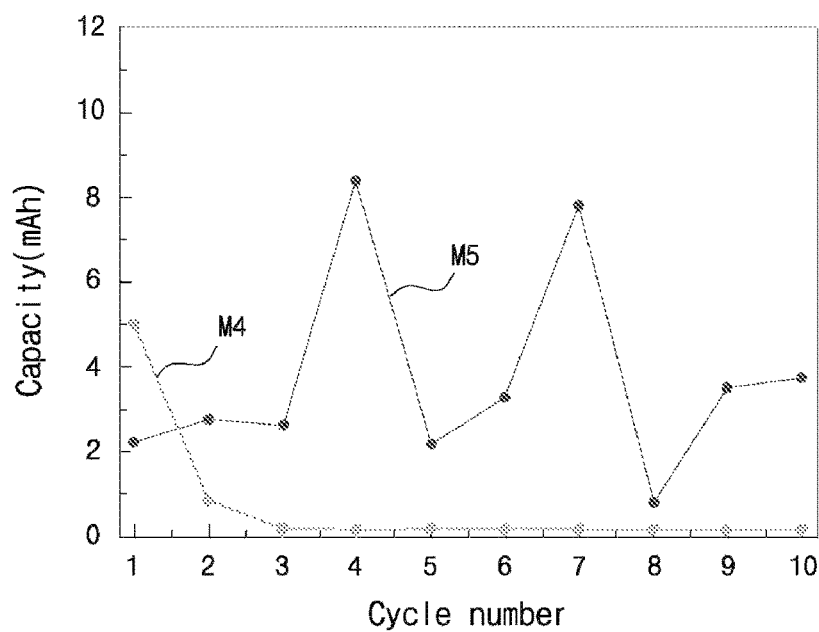

The results were shown in FIGS. 10 and 11. FIG. 10 is a graph of the discharge capacities measured in Example 14 (curve M1), Example 15 (curve M2), and Example 16 (curve M3), and FIG. 11 is a graph of the discharge capacities measured in Example 17 (curve M4) and Example 18 (curve M5).

With reference to these graphs of the discharge capacities, it could be seen that the heat treatment temperature and heat treatment time were sensitive to the capacity of the battery. That is, as the heat treatment time at 150° C. was increased to 3 hours (Example 14 shown in the curve M1 of FIG. 10), 6 hours (Example 15 shown in the curve M2 of FIG. 10), and 12 hours (Example 16 shown in the curve M3 of FIG. 10), it could be seen that the capacity was increased gradually and stable cycle characteristics were exhibited. When the heat treatment time at 150° C. was set to 3 hours (Example 14 shown in the curve M1 of FIG. 10), it could be seen that an unstable cycle characteristic was exhibited.

In addition, when the heat treatment proceeds for 3 hours at 250° C. (Example 17 shown in the curve M4 of FIG. 11), the capacity significantly decreased and performance of the battery was exhibited. In the case of the heat treatment for 6 hours (Example 18 shown in the curve M5 of FIG. 11), an extremely unstable cycle characteristic was exhibited as in the case of the heat treatment proceeds for 3 hours at 150° C.

Therefore, the heat treatment may vary depending on the combination state of the slurry, but in some embodiments of the present invention, it is preferable to perform the heat treatment for 6-12 hours at 150~200° C., and the heat treatment can be also performed for 2 to 12 hours at 50~300° C.

That is, when performing the heat treatment at less than 150° C. for less than 6 hours, the organic solvent was not completely removed, and thus vaporized during driving the battery, to thus cause cracks and exfoliation in the battery, and cause a side reaction during charging and discharging, thereby exhibiting unstable cell characteristics to thus affect the reliability.

Further, when performing the heat treatment at a temperature exceeding 250° C., decomposition of the binder such as PVDF is caused to thus fail to act as a binder. Accordingly, adhesion of the positive electrode active material is lowered and the positive electrode active material is separated from the metal foam during charging and discharging, to thus reduce the charge-discharge characteristics or lose a function as a battery even with no charge-discharge characteristics.

As described above, the present invention has been described with respect to particularly preferred embodiments. However, the present invention is not limited to the above embodiments, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

The present invention can be applied to a method of manufacturing a lithium secondary battery having an excellent oxidation/reduction reaction rate of lithium and a battery capacity characteristic, by increasing a surface area in which the positive electrode active material adhered in the pores of the metal foam contacts an electrolytic solution, and thus reducing an internal resistance of the lithium secondary battery.

The invention claimed is:

1. A method of manufacturing a lithium secondary battery, the method comprising the steps of:
    preparing a metal foam having a plurality of first pores;
    filling a slurry made by mixing a positive electrode active material, a binder, a conductive material and an organic solvent into the first pores of the metal foam;
    removing the organic solvent in the slurry by heat-treating the slurry-filled metal foam, to thereby adhere the positive electrode active material, the binder and the conductive material on inner walls of the first pores, and thus obtain a metal foam positive electrode in which second pores smaller than the first pores are formed in the first pores;
    coating an electrolytic solution on a surface of the metal foam positive electrode to thereby penetrate the electrolytic solution into the second pores; and
    sequentially laminating a separator and a negative electrode on both surfaces of the metal foam positive electrode into which the electrolytic solution has been penetrated.

2. The method of manufacturing a lithium secondary battery according to claim 1, wherein the viscosity of the slurry is preferably of 1,000~100,000 cP.

3. The method of manufacturing a lithium secondary battery according to claim 1, wherein the heat treatment is preferably conducted for 2 to 12 hours at a temperature of 50~300° C.

4. The method of manufacturing a lithium secondary battery according to claim 1, wherein the metal foam can be made of an alloy such as Al, NiCrAl, NiFeCrAl, NiCr, NiAl, or CrAl, and the first pores are formed of a three-dimensional open pore structure.

5. The method of manufacturing a lithium secondary battery according to claim 1, further comprising a step of reducing thickness of the metal foam positive electrode by pressing the metal foam positive electrode, between the step of obtaining the metal foam positive electrode and the step of coating the electrolytic solution on the surface of the metal foam positive electrode to thereby penetrate the electrolytic solution into the second pores.

6. The method of manufacturing a lithium secondary battery according to claim 1, wherein the metal foam positive electrode has a thickness that is 1.5 to 2 times as large as those of the first pores in size.

7. The method of manufacturing a lithium secondary battery according to claim 1, wherein the binder preferably contains 1~50 wt % in the total weight of a positive electrode material made of the positive electrode active material, the binder, and the conductive material.

8. The method of manufacturing a lithium secondary battery according to claim 1, wherein the conductive material is a carbon-based powder, and contains 5 to 30 wt % in the total weight.

* * * * *